United States Patent
Sanduja et al.

[11] Patent Number: 6,040,378
[45] Date of Patent: Mar. 21, 2000

[54] COATING FOR GLASS SUBSTRATE FOR ANTI-REFLECTIVE PROPERTIES WITH ABRASION, CHEMICAL AND UV RESISTANCE

[75] Inventors: Mohan L. Sanduja, Flushing; Carl Horowitz, Brooklyn; Abraham Thomas, Staten Island; Paul Thottathil, New Hyde Park, all of N.Y.

[73] Assignee: AFG Industries, Inc., Kingsport, Tenn.

[21] Appl. No.: 09/079,148

[22] Filed: May 15, 1998

[51] Int. Cl.[7] ................. C08J 3/00; C08K 3/20; C08K 5/54; C08K 5/56; C08L 83/00
[52] U.S. Cl. .................. 524/588; 524/730; 524/731; 524/837; 525/100; 525/403; 525/477; 525/540; 528/10; 528/12; 528/17; 528/31; 528/33; 528/34; 528/38; 528/32
[58] Field of Search ................. 524/588, 730, 524/731, 837; 525/100, 403, 477, 540; 528/10, 12, 17, 31, 33, 34, 38, 32

[56] References Cited

U.S. PATENT DOCUMENTS

| | | |
|---|---|---|
| 2,207,656 | 7/1940 | Cartwright et al. . |
| 2,220,862 | 11/1940 | Blodgett . |
| 2,337,460 | 12/1943 | French . |
| 3,698,931 | 10/1972 | Horowitz . |
| 3,761,160 | 9/1973 | Apfel et al. . |
| 3,854,796 | 12/1974 | Thelen . |
| 4,410,563 | 10/1983 | Richter et al. . |
| 4,808,640 | 2/1989 | Morita et al. ............... 523/433 |
| 4,977,029 | 12/1990 | Brown et al. . |
| 5,091,244 | 2/1992 | Biornard . |
| 5,232,748 | 8/1993 | Horowitz et al. . |
| 5,646,781 | 7/1997 | Johnson, Jr. . |
| 5,660,895 | 8/1997 | Lee et al. . |
| 5,691,044 | 11/1997 | Oyama et al. . |
| 5,703,192 | 12/1997 | Sugama . |

OTHER PUBLICATIONS

I. Scheinfeld, Ph.D.; "Grafting of Polymers by Purely Chemical Means"; Polymer News, vol. 2, No. 11/12; pp. 19–25.
Dow Corning Corporation; Product Information; Dow Corning Z–6030 silane; 1992.
OSI Specialties; "Silquest Y–9669 Silane"; 1995; 4pp.
Union Carbide; Silicones Organofunctional Silanes Product Information "Union Carbide Organofunctional Silane A–187", 3pp.
MEI; ZPP Zirconium Propionate; Data Sheet 374.

*Primary Examiner*—Patrick D. Niland
*Attorney, Agent, or Firm*—Oblon, Spivak, McClelland, Maier & Neustadt, P.C.

[57] ABSTRACT

The present invention relates to a polymeric coating composition for application onto glass substrates for anti-reflective properties. The coating is provided via chemical grafting that involves the use of monomers and/or prepolymers, catalyst, and graft initiator and when applied onto the surface of the glass substrate forms a polymeric film chemically bonded to the glass with excellent adhesion. This coating can reduce the reflectance of the coated glass surface to as close to zero as possible, thus maximizing transmittance and providing resistance to abrasion, water/chemical attack, and UV degradation.

6 Claims, 1 Drawing Sheet

COATING FOR GLASS SUBSTRATE FOR ANTI-REFLECTIVE PROPERTIES WITH ABRASION, CHEMICAL AND UV RESISTANCE

BACKGROUND OF THE INVENTION

1. Field of the Invention

In the area of photovoltaics there is a constant push for greater efficiencies. Typical commercially available solar cell efficiencies vary anywhere from 10% for polycrystalline cells to as high of 25% for single crystal. In order to increase the energy output of the cells, manufacturers use glass substrates with higher transmittance than normal float glass. This increases the transmittance by approximately 2%. If the transmittance could be increased further, it would be a boon to the solar cell industry, lowering the cost per watt and thereby making solar power more affordable.

2. Discussion of the Art

We have long known from the work of Fresnel that the reflection from the surface of glass is controlled by the difference between the refractive index of the glass and the refractive index of air according to the following formula: $((n-1)/(n+1))^2$, where n is the refractive index of the glass and the refractive index of air is one. For most commercial glasses n=1.52, which means that you have approximately 4% of light reflected from the air glass interface. See FIG. 1. If there was no absorption of the light energy by the body of the glass 96% of the incoming light energy would pass through the glass. However, when the light emerges from the glass and again passes into air (n=1) light is reflected such that only 92.16% of the total energy emerges in the light. (See FIG. 2). For most ordinary purposes this surface reflectance is of no significance. However, in the case of photovoltaics which have relatively low efficiencies in converting light to electricity, recovering any of this lost light due to reflection would prove to be a benefit.

One way to reduce the reflectance from a given surface is to somehow form a layer of material of a lower refractive index on it. Again from Fresnel's work we see that if a layer having a refractive index of 1.24 is placed on the surface of a material having a refractive index of 1.52 a reduction in reflection can be achieved such that as shown in FIG. 3. Such a layer system can and has been achieved in many ways over the past few decades. Examples include:

Fluoride Coatings Involving the Use of Alkali Fluorides

Some of the earliest low reflectance coatings involved placing a film of magnesium fluoride which has a refractive index of 1.38 on the surface of glass. The processing is complex and expensive and the films are not all that strong.

Etched Films

People have also used a controlled etching process involving the use of hazardous chemicals. Long processing times are required and the resultant films are easily damaged. This process works by removing constituents of the glass and leaving a skeletal film of silica where the refractive index of the total film is a volume average of the silica skeleton and the air in the interstices. These films are also very delicate.

Porous Films

These skeletal films are produced without etching by using a sol-gel to form a film of silica particles on the surface of glass such that the refractive index of the film is an average of the refractive index of the silica particles and the air inbetween them. These films by nature are also very delicate and the application process is very exacting.

Multilayer

Additional layers of glasses with various refractive indexes fused to the surface with a second layer of a material with a lower refractive index. This process involves very high heat.

Sputter Coating

A complex process which is expensive in terms of power required, materials and handling.

All of the above films, while very good low reflectance films, require that they be manufactured in separate operations prior to solar cell manufacture. These processes involve the use of equipment to generate high temperatures, high vacuum or use hazardous materials to create the films.

What is needed is a low cost process that creates a low reflectance coating on one surface of the glass that can be used in an existing production line for glass or solar cell manufacture with a minimum amount of trouble or expense. Through the innovative combination of commercially available chemicals and the process of chemical grafting such a coating has now been developed.

SUMMARY OF THE INVENTION

Figure 1:
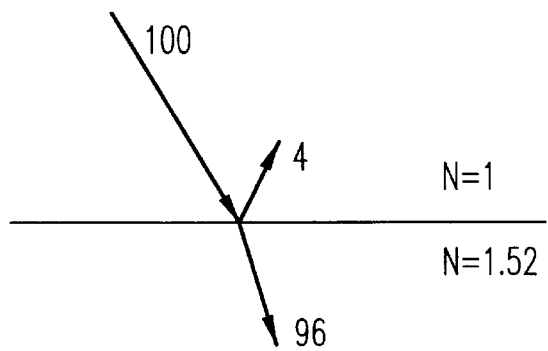
FIGS. 1–3 show the various reflectance and transmittance properties of various glasses with and without coatings.
Figure 2:
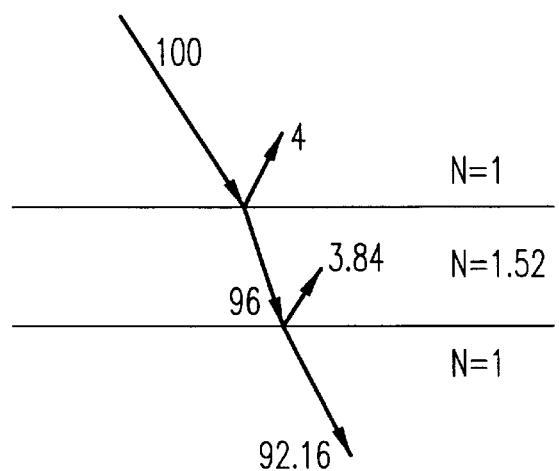
Figure 3:
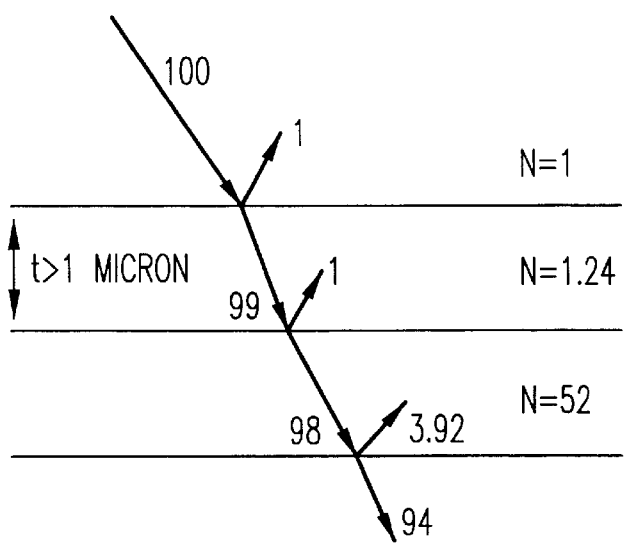

One objective of this invention is to provide a polymeric coating for glass surfaces which is chemically bonded to the surface on the glass. This coating preferably has not only anti-reflective properties (increased transmittance in excess of one percent) but also a high degree of resistance to abrasion, water/chemicals, and UV degradation. The present invention provides these objects by covering the surface of a glass substrate with a protective and anti-reflective coating made by chemically grafting organic monomers and pre-polymers onto the surface of the glass, resulting in a polymeric film strongly bonded to the glass surface. The monomers/prepolymers are preferably selected such that the polymeric film grafted onto the glass surface has excellent anti-reflective (increased transmittance) properties and, optionally, protective properties in terms of abrasion, chemical and/or water resistance, and resistance to environmental conditions such as humidity and corrosive gases.

DETAILED DESCRIPTION OF THE INVENTION

The basic starting material (hereinafter referred to as "substrate") of the present invention is glass which can be represented as S—OH where S represents the base glass material. Any type of glass may be used. Preferred types of glasses useful herein include soda-silica-lime glasses, etc. While not bound by any particular theory, it is believed that, as a first step to grafting, a substrate radical is formed presumably by the removal of a hydrogen ion or atom from the glass substrate, e.g., from the hydroxyl (—OH) group, by a graft initiator (represented in the reaction step below as "GI"). The graft initiator can remove hydrogen and any of one, zero or two electrons. An example of a series of steps involved in the grafting process are given in steps 1–7 below:

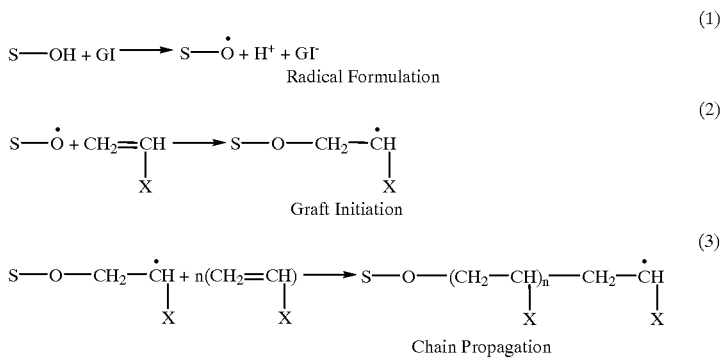

Radical Formulation (1)

Graft Initiation (2)

Chain Propagation (3)

All of the foregoing reactions take place in the presence of peroxide which concurrently regenerates the graft initiator as shown in reaction (4).

(4)

The graft propagation may be terminated by radical combination which may occur as shown in steps (5) and (6).

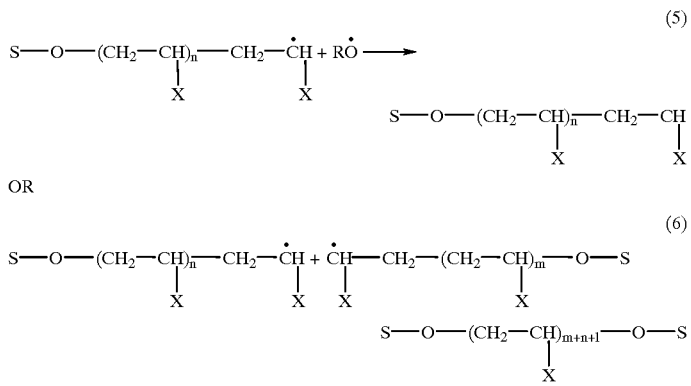

The processes of initiation, propagation and termination may be different when an anion or cation are generated by GI, when the formulation contains reactive prepolymers or polymers, etc. For example, prepolymers may undergo activation by the graft initiator giving reactive species P which react with the radical on the glass substrate to form a graft coating on the substrate, as follows:.

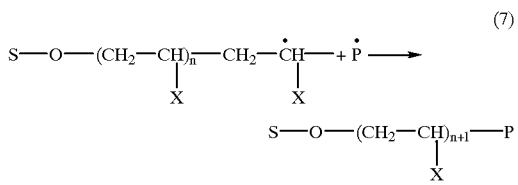

(7)

In the present invention the graft initiator GI may be any one or more of the following metal ions $Fe^{+++}$, $Fe^{++}$, $Ag^+$, $Co^{++}$, zirconium in any oxidation state and $Cu^{++}$ and the peroxide may be chosen from inorganic and organic peroxide catalysts such as benzoyl peroxide, MEK peroxide, etc.

The compositions of the invention preferably comprises:

a) at least one monomer such as the acrylates and methacrylates of methyl, ethyl, butyl and glycidyl groups or a reactive silyl functional monomer (0.01–1% by weight based on total weight)

b) at least one silicone prepolymer such as methyl polysiloxane, dimethyl siloxane, dimethyl-diethyl siloxane, dimethyl hydroxy terminated siloxane (20–99% by weight based on total weight c) at least one graft initiator (0.00001–5% by weight based on total weight)

d) at least one radical initiator such as an inorganic or organic peroxide (0.00001–5% by weight based on total weight), and e) an optional organic solvent such as butanol tolulene, ethanol, hexane, $CCl_4$, etc. (0–80% by weight based on total weight).

In a preferred embodiment the formulations are one-component systems. For example, a requisite amount of silicone prepolymer monomer, graft initiator, and any other ingredients of the composition are mixed and then stirred to a uniform solution.

To form a coating according to the invention the composition is applied onto a glass surface by any means such as knife blade coating, spraying, etc. The coated samples are then subjected to cure for example at 150° F. for 15–20 minutes. The coating can also be applied by dipping—in that case, the viscosity of the formulation should be adjusted to stay on the glass. The coatings can be of any thickness, including less than 0.0005 in. and more than 0.5 in.

EXAMPLES

The following examples illustrate the composition of the invention, however, the scope of this invention is not limited to the specific details of the examples.

Example 1

| INGREDIENTS | PARTS BY WEIGHT |
| --- | --- |
| Silicone Resin Prepolymer GR 653 (32% methylpolysiloxane polymer solution in methanol/butanol) (OI-NEG TV Products Inc.) | 50.00 |
| Normal Butanol | 16.66 |
| Monomer Silane Z 6030 (Dow Corning Methacrylate-functional trimethoxysilane) | 0.10 |
| Benzoyl Peroxide (0.1% Solution in Toluene) | 0.10 |
| Zirconium Propionate ($C_3H_6O_2$ ¼ Zr) (1% Solution in Butanol) (ZPP: Magnesium Elektron, Inc./MEL Chemicals) | 25.00 |

Example II

| INGREDIENTS | PARTS BY WEIGHT |
| --- | --- |
| Silicone Prepolymer GR 653 (32% methylpolysiloxane polymer solution in methanol/butanol) | 100.00 |
| Normal Butanol | 33.00 |
| Organofunctional Silane Y 9669 (OSI Specialties: $C_6H_5NH(CH_2)_3Si(OCH_3)_3$) | 0.20 |
| Benzoyl Peroxide (0.1% Solution in Toluene) | 0.10 |
| Zirconium Propionate (1.5% Solution in N. Butanol) | 15.00 |

EXAMPLE III

| INGREDIENTS | PARTS BY WEIGHT |
| --- | --- |
| Silicone Prepolymer GR 653 (32% methylpolysiloxane polymer solution in methanol/butanol) | 50.00 |
| N. Butanol | 17.00 |
| Monomer Silane A 187 (Union Carbide Organo functional silane: gammaglycidoxy propyl trimethoxysilane) | 0.10 |
| Trimethylol Propane Triacrylate | 0.15 |
| MEK Peroxide (1% Solution in MEK) (Elf Atochem: 2-Butanone peroxide) | 0.01 |
| Zirconium Propionate (1% Solution in Butanol) | 20.00 |

Preferred monomers are reactive trimethoxy silyl group-containing monomers with reactive groups such as acrylate, methacrylate, amino, epoxy, etc.

To use the above compositions they may be spray-coated onto glass with, e.g., a paint sprayer followed by heating to approximately 200° F. for one to several seconds (heat lamps, etc.). Such coating can be conducted on the glass line, if desired.

All product brochures and Material Safety Data sheets of materials described herein are incorporated herein by reference.

Obviously, numerous modifications and variations of the present invention are possible in light of the above teachings. It is therefore to be understood that within the scope of the appended claims, the invention may be practiced otherwise than as specifically described herein.

We claim:

1. A coating composition comprising methylpolysiloxane, a methacrylate-functional trimethoxysilane, benzoyl peroxide and zirconium propionate.

2. A coating composition comprising methylpolysiloxane, an organoflinctional silane of the formula $C_6H_5NH(CH_2)_3Si(OCH_3)_3$, benzoyl peroxide and zirconium propionate.

3. A coating composition comprising methylpolysiloxane, gammaglycidoxy propyl trimethoxysilane, trimethylol propane triacrylate, methylethyl ketone peroxide and zirconium propionate.

4. The coating composition as claimed in claim 1, further comprising normal butanol.

5. The coating composition as claimed in claim 2, further comprising normal butanol.

6. The coating composition as claimed in claim 3, further comprising normal butanol.

* * * * *